Patented Mar. 24, 1936

2,034,697

UNITED STATES PATENT OFFICE 2,034,697

COSMETIC MAKE-UP BASE AND METHOD OF MANUFACTURE

Frank Factor, Beverly Hills, Calif., assignor to Max Factor & Co., Los Angeles, Calif., a corporation of Delaware No Drawing. Application April 5, 1935, Serial No. 14,925

3 Claims. (Cl. 167—90)

This invention pertains generally to cosmetic make-up bases for application to the skin to condition it for the subsequent application of powder or rouge, and has for one of its major objects to provide a make-up base having the distinctive physical characteristic, as compared with the usual grease paint base, of being made in the form of a solid cake, instead of a cream.

Another purpose of the invention is to avoid certain oftentimes objectionable characteristics and requirements of the usual grease paints. Generally speaking, the latter ordinarily comprise a mixture or pasty emulsion including oils and greases which to some persons are objectionable because of their effect upon the skin. These grease paints have the further disadvantage of requiring the use of cold cream for their removal, the surface tension of the contained oils and greases being so great as to prevent their being conveniently removed by soap and water. In contrast to these usual grease paints, the present product may be made entirely free from oils or greases and is immediately removable from the skin by soap and water without the least difficulty. I may include in the product a relatively small amout of oil, if for any reason it is found desirable, without interfering with its ready removability, since I may use as the vehicle for the texture ingredient and pigment, substances having the property of reducing the surface tension of the oil to the point where the latter can easily be taken off with soap and water. However, I prefer that the product shall be oil-free and without any constituents that will either affect the skin in any undesirable manner or lessen the capability of the material of being washed from the skin with water.

The invention contemplates the further object of providing a make-up base in solid or cake form in which the texture ingredient and pigment vehicle comprises a substance or mixture of substances having the general properties of soap, whereby the material can be readily taken from the cake and applied to the skin simply by the use of a sponge or the like, moistened with water. The present product is believed to be the first make-up base capable of being made without oils or greases, and whose composition may include only the pulverulent texture ingredient and pigment, together with a vehicle of the character mentioned above and as hereinafter more particularly described. Accordingly, as to this aspect, the invention is not regarded as limited to any particular physical form of product.

All these and additional characteristics of the product can be explained and understood to best advantage, by describing a typical and preferred method of making the product, and various particular ingredients used, or capable of being used, in its composition. And in this connection it may be mentioned that the invention contemplates certain novel aspects of the method of manufacture as well as the product itself.

Any suitable texture ingredient, or mixture of such ingredients, may be used that will give to the make-up base, when applied, the desired spreading power and consistency, body or texture. The following may be cited as typical: Zinc and aluminum stearates, talc, kaolin and the oxides of titanium, zinc and magnesium. In addition, I will ordinarily include pulverulent pigment or mixture of pigments to give the material any desired color. The pigment may consist of any of the usual substances such as iron oxide and lake colors.

As a carrier or vehicle for the texture ingredient and pigment, I use a liquid substance or composition possessing properties that are primarily responsible for the ability to make the product in solid or dry cake form and to render it capable of being removed from the cake by a moistened applicator. The vehicle is also selected for its spreading power and ability to retain, when applied to the skin, flexibility and resistance to cracking even after long exposure to the air. Substances suitable for use as the vehicle ingredient of the product may be classified generally under stearates, esters, glycerol esters, or suitable waxes (animal, vegetable or mineral), though preferably not of a greasy or oily character. To give more specific examples of substances suitable for the vehicle, cetyl alcohol, lanolin, cholesterol, iso-cholesterol and the glycerol stearates may be cited as typical. These may be used selectively and in any desired proportions, depending upon the particular properties or characteristics desired in the vehicle, as will be readily recognized by those familiar with the art. In now describing the method of making the product, I will for convenience refer to the use of lanolin as the pigment and oxide vehicle, with the understanding however that lanolin is referred to in the description of the product and its method of manufacture, as well as in the claims, merely as typifying a suitable vehicle selectable from the general class of substances mentioned above.

I first heat a suitable quantity of lanolin containing a free fatty acid, for example a relatively small proportion of stearic acid, to a temperature sufficient to reduce the viscosity of the lanolin to a free flowing liquid. The latter is then mixed with an aqueous solution of a suitable emulsifying agent, typically and preferably triethanolamine, preheated sufficiently to prevent initial excessive cooling of the lanolin. When combined, the melted lanolin and aqueous solution of triethanolamine are intimately mixed to form an emulsion, in which the emulsifying agent is a soap, the product of reaction between triethanolamine and the stearic acid. I then add to this emulsion a prepared uniform mixture of the texture ingredients and pigment, and thoroughly disperse the pulverulent ingredients in the emulsion by passing the entire mixture through a colloid mill, or by treatment in any other suitable manner. At this point I have thus obtained a perfect suspension of the texture ingredients and pigment within the water and lanolin emulsion.

With reference to the general proportions in which the ingredients are compounded, I may cite the following as a typical example: twenty-five parts of combined lanolin, triethanolamine, and stearic acid, to seventy-five parts of combined texture ingredients and pigment, with the addition of a sufficient quantity of water, say around one hundred parts, to form an emulsion sufficiently fluid after the addition of the texture ingredients and pigment, to permit complete and uniform dispersion of the latter. After a suspension of the texture ingredients and pigment in the emulsion has been formed as described above, the material is evaporated to complete dryness, or substantially to complete dryness, leaving a solid mass, this residual material is then compressed into cakes to form the products in its final condition, the lanolin and soap present having sufficient bonding qualities to give the product a firm hardness. The product may be packed for use in a compact type or any other suitable container.

As previously mentioned, it is only necessary for removal of the product from the cake for use as a make-up base, to use a sponge or other applicator moistened with water. The effect produced by rubbing the cake with a moistened sponge is to again form a suspension in an emulsion, similar to the condition of the components before the evaporation to dryness, the emulsifying action being made reversible by reason of the solubility of the soap in the water applied to the cake by the sponge, and the presence of the lanolin. The emulsion thus obtained by rubbing the cake is applied to the skin and the water permitted to evaporate to the extent which it will at atmospheric temperature, leaving a film that is fully flexible and resistant to cracking even after extended exposure. Since this make-up base film consists only of inert pigments and an entirely greaseless vehicle, it is readily apparent that the film may be removed simply by washing with water.

I claim:

1. A make-up material in solid form comprising a compressed body containing pulverulent texture ingredients and pigment, in uniform distribution within a mixture of lanolin with a soap, the lanolin being emulsifiable with water by rubbing the surface of said body with a moistened applicator.

2. The process of preparing a make-up base, that includes forming an emulsion of water with lanolin in the presence of a soap and suspending pulverulent solids in uniform distribution throughout said emulsion, and then evaporating the emulsion substantially to dryness.

3. A make-up material in solid form comprising a compressed body containing pulverulent texture ingredients and pigment, in uniform distribution within a mixture of lanolin with a soap, the lanolin being emulsifiable with water by rubbing the surface of said body with a moistened applicator, and said material being substantially free of oil and grease.

FRANK FACTOR.